(12) United States Patent
Droulez et al.

(10) Patent No.: US 11,180,020 B2
(45) Date of Patent: Nov. 23, 2021

(54) DEVICE FOR CONTROLLING AN AIR FLOW

(71) Applicant: Valeo Systemes Thermiques, Le Mesnil Saint Denis (FR)

(72) Inventors: Eric Droulez, Le Mesnil Saint Denis (FR); Mikhaël Preschner, Le Mesnil Saint Denis (FR); Carlos Martins, Le Mesnil Saint Denis (FR); Anne-Sylvie Magnier-Cathenod, Le Mesnil Saint Denis (FR); Bertrand Gessier, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 161 days.

(21) Appl. No.: 16/489,119

(22) PCT Filed: Feb. 28, 2018

(86) PCT No.: PCT/FR2018/000043
§ 371 (c)(1),
(2) Date: Jan. 8, 2020

(87) PCT Pub. No.: WO2018/158513
PCT Pub. Date: Sep. 7, 2018

(65) Prior Publication Data
US 2020/0156461 A1    May 21, 2020

(30) Foreign Application Priority Data
Feb. 28, 2017 (FR) ...................... 1751620

(51) Int. Cl.
*B60K 11/00* (2006.01)
*B60K 11/04* (2006.01)
*B60K 11/08* (2006.01)

(52) U.S. Cl.
CPC ............ *B60K 11/04* (2013.01); *B60K 11/085* (2013.01)

(58) Field of Classification Search
CPC .............................. B60K 11/04; B60K 11/085
See application file for complete search history.

(56) References Cited

U.S. PATENT DOCUMENTS

| | | | |
|---|---|---|---|
| 1,492,897 A * | 5/1924 | Ryder | ...................... F01P 7/10 49/38 |
| 5,901,786 A | 5/1999 | Patel et al. | |

(Continued)

FOREIGN PATENT DOCUMENTS

| | | |
|---|---|---|
| DE | 102006054970 A1 | 5/2008 |
| DE | 102011009778 A1 | 8/2012 |

(Continued)

OTHER PUBLICATIONS

International Search Report and Written Opinion issued in corresponding International Patent Application No. PCT/FR2018/000043, dated Jul. 13, 2018 (14 pages).

*Primary Examiner* — Hau V Phan
(74) *Attorney, Agent, or Firm* — Osha Bergman Watanabe & Burton LLP

(57) ABSTRACT

The invention concerns a device (12) for controlling an air flow (F) circulating in a first heat exchanger (4) for a motor vehicle comprising at least two screens (14), the control device (12) being configured to go from a closed configuration in which the screens (14) obstruct the passage of the air flow (F) completely to an open configuration in which the screens (14) are positioned in such a manner as to allow the air flow (F) to pass with a maximum flow rate, and any intermediate configuration. According to the invention, the two screens (14) are adapted to be moved away from one another when the control device (12) goes from the closed configuration to the open configuration and to be moved toward one another when the control device (12) goes from the open configuration to the closed configuration.

12 Claims, 5 Drawing Sheets

(56) References Cited

U.S. PATENT DOCUMENTS

| | | | | |
|---|---|---|---|---|
| 7,147,269 B2* | 12/2006 | Aase | ...................... | B64C 23/00 |
| | | | | 296/180.1 |
| 8,025,045 B2* | 9/2011 | Pettersson | ............ | B60K 11/085 |
| | | | | 123/568.12 |
| 8,302,714 B2* | 11/2012 | Charnesky | ........... | B60K 11/085 |
| | | | | 180/68.1 |
| 8,474,512 B2* | 7/2013 | Pettersson | ........... | F02B 29/0462 |
| | | | | 165/41 |
| 8,485,296 B2* | 7/2013 | Charnesky | ........... | B60K 11/085 |
| | | | | 180/68.1 |
| 8,997,907 B2* | 4/2015 | Rode | ................... | B62D 35/001 |
| | | | | 180/68.1 |
| 2006/0211364 A1* | 9/2006 | Brotz | ................. | B60K 11/085 |
| | | | | 454/261 |
| 2015/0183313 A1* | 7/2015 | Bruckner | ............. | B60K 11/085 |
| | | | | 180/68.1 |
| 2015/0246608 A1 | 9/2015 | Schmidt et al. | | |
| 2016/0040634 A1* | 2/2016 | Haight | ............... | B01D 46/0083 |
| | | | | 95/26 |

FOREIGN PATENT DOCUMENTS

| | | |
|---|---|---|
| DE | 102014104041 A1 | 9/2015 |
| DE | 102014104784 A1 | 10/2015 |
| DE | 102014113067 A1 | 3/2016 |
| WO | 2016/087545 A1 | 6/2016 |

* cited by examiner

DEVICE FOR CONTROLLING AN AIR FLOW

FIELD OF THE INVENTION

The present invention concerns a device for controlling an air flow circulating in a first heat exchanger for a motor vehicle and a cooling module fitted with a device of that kind.

BACKGROUND OF THE INVENTION

In this field there are known cooling modules typically comprising two heat exchangers, a first exchanger having the function of cooling an auxiliary circuit of the vehicle, such as an air conditioning device or a supercharging air cooling device, by means of a so-called low-temperature loop and a second heat exchanger needed to cool the engine of the vehicle. They are disposed at the front of the vehicle to have pass through them an air flow entering via the radiator grille of the vehicle. They include a heat exchange bundle through which the fluid to be cooled passes and across which the air from the grille passes.

To form a compact module, the two exchangers are assembled and aligned in series one after the other so that an air flow circulates in the two exchangers in succession. The module is disposed in the vehicle so that the air circulates first in the first exchanger and then in the second heat exchanger because of their respective cooling requirements.

However, this type of module does not enable dissociation of the cooling of the two exchangers. This represents a drawback because it may be desirable in some situations to avoid cooling the engine in order for it to warm up more rapidly, in particular when starting it.

In parallel with this, the flow of air in the module penalizes the aerodynamics of the vehicle. In fact the air that is engulphed under the hood of the vehicle in the cooling module inside the vehicle opposes an additional resistance to the movement of the vehicle. It is therefore all the more harmful to allow the air to pass through all of the module if there is no need for cooling at the level of the second exchanger whilst still allowing use of the air conditioning or supercharger air cooling.

Known solutions, such as for example the one described in the document US 2015 246 608, propose cooling devices with a roller blind arranged vertically in front of the two heat exchangers. The blind can be rolled up more or less to enable control of the air flow. In most cases opening the entirety of the surface of the exchangers is not necessary for the cooling requirements, the components being rated for critical conditions. Moreover, untimely opening and closing of the screen in a manner parallel to the tubes may lead to thermal shock at the level of the exchanger. Such thermal shock impacts the tubes by causing their length to vary. This creates differential expansion at the level of the ends of the tubes fixed to the manifolds, causing leaks. The risk of leaks is increased in the case of partial openings positioned in a non-homogeneous manner.

There is therefore a benefit in designing a partial opening system that can be adapted in order to optimize aerodynamic gains in the light of thermal requirements.

SUMMARY OF THE INVENTION

An objective of the invention is therefore to overcome these drawbacks and to this end it proposes a device for controlling an air flow circulating in a first heat exchanger for a motor vehicle, the control device comprising at least two screens, the control device being configured to go from a closed configuration in which the screens obstruct the passage of the air flow completely to an open configuration in which the screens are positioned in such a manner as to allow the air flow to pass with a maximum flow rate, characterized in that the two screens are adapted to be moved away from one another when the control device goes from the closed configuration to the open configuration and to be moved toward one another when the control device goes from the open configuration to the closed configuration.

On moving away from one another, for example from a central position, the screens by opening therefore guarantee that the air flow is oriented toward the central part of the heat exchangers, thereby reducing thermal shock and differential expansion at the level of the tube ends.

Other embodiments propose that:
the screens are arranged to occupy one or more intermediate positions between the closed configuration and the open configuration;
the screens are arranged in a frame adapted to prevent all contact between one of said screens and a heat exchanger;
the screens include a lip seal at one end, in particular the end facing the other screen;
a closing element is arranged between the two screens on which the screens come to bear on completing their travel into the closed configuration;
the closing element includes a cylindrical rod with notches, in particular of complementary shape to the lip seals;
a first screen includes a lip seal with a rib and the second screen features a lip seal with a groove of complementary shape to the rib;
the screens are configured to be moved by an actuator, the actuator being a motor coupled to the closing element, said closing element being connected to each screen by means of at least one filamentary connection;
the screens are configured to be moved by an actuator, the actuator being a motor coupled to a gear by means of a belt, said belt being connected to each screen by means of at least one filamentary connection;
the screens are configured to be moved by an actuator, the actuator being a motor coupled to a lead screw, the lead screw being connected to each screen by means of at least one filamentary connection;
the screens are adapted to be moved simultaneously;
alternatively, the screens are adapted to be moved independently, for example one begins to move while the other is still at rest or one ceases to move while the other is still moving;
the control device includes a spring, in particular a torsion spring, adapted to maintain the screen or screens under tension at all times;
the screens are adapted to be mobile perpendicularly to the tubes of the exchangers;
discharge flaps may be added to ensure the flow of air over the first exchanger when there is no need for cooling by the high-temperature heat exchanger, the retractable screens remaining closed;
the control device includes a frame for the retractable screens, which frame is located in front of the high-temperature heat exchanger;
the frame also enables the seal between the two radiators or heat exchangers and the control device to be guaranteed;
the shafts of the retractable screens are fixed to the frame;

the screens are adapted to be actuated separately thanks to a pulley mechanism, in particular associated with two independent actuators.

According to one embodiment of the invention, the thickness of the screens is between 0.1 and 0.15 mm inclusive.

In particular embodiment of the invention, at least one of the screens, in particular both screens, is/are made of canvas, in particular textile canvas.

According to one embodiment of the invention, the canvas includes glass fibers and preferably a PTFE coating.

According to one embodiment of the invention, the frame and the screens occupy an overall size in the axial direction, measured along the axis of the air flow, less than 30 mm, in particular less than 20 mm.

The invention also concerns a cooling module comprising,
a low-temperature heat exchanger,
a high-temperature heat exchanger, and
a control device as described above arranged between the two exchangers,
the low-temperature heat exchanger being positioned on the upstream side of the control device and the high-temperature heat exchanger being positioned on the downstream side of the control device.

BRIEF DESCRIPTION OF DRAWINGS

Other features and advantages of the invention will become more apparent on reading the following description with reference to the appended figures given by way of illustration only and with no intention of limiting the invention of embodiments given by way of illustration. In those figures.

DETAILED DESCRIPTION OF EMBODIMENTS

Figure 1:
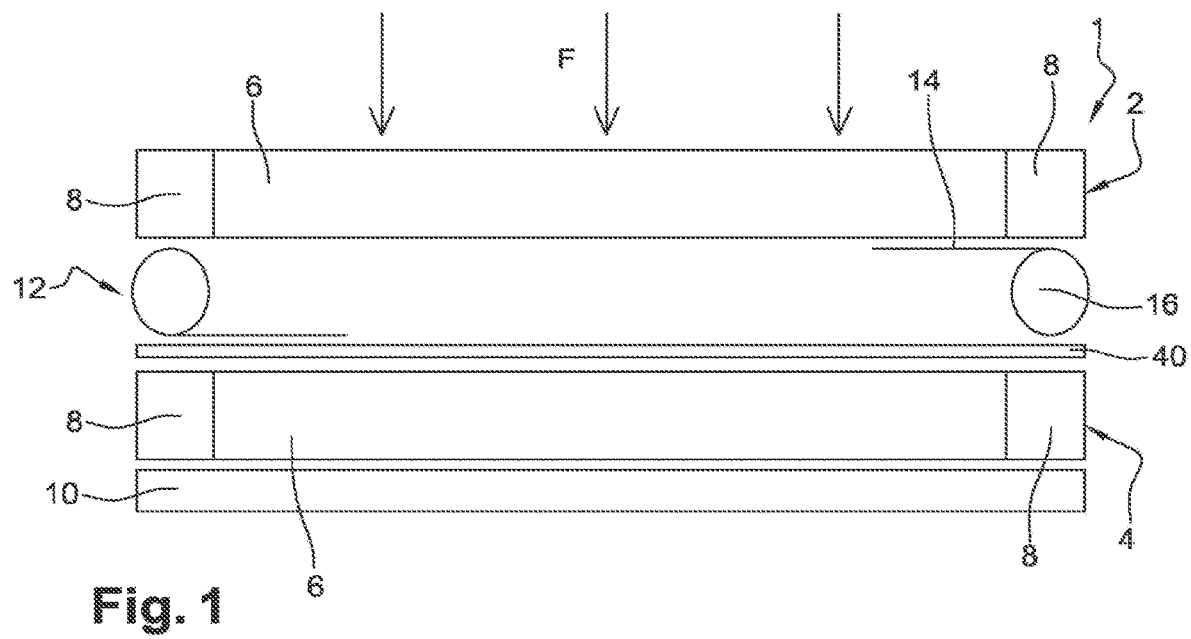
FIG. 1 is a diagrammatic view showing a device for controlling an air flow and a cooling module both according to the invention as seen from above.

FIG. 1 shows a device 12 for controlling an air flow F and a cooling module 1 both according to the invention, in particular for a motor vehicle, seen from above. The cooling module 1 comprises an upstream heat exchanger 2 and a downstream heat exchanger 4 arranged in series in the direction of flow of an air flow F passing through them. In other words, the cooling module 1 is configured to be disposed on a support, such as the chassis of a vehicle, so that the upstream heat exchanger 2 has an air flow F pass through it first and pass through the downstream heat exchanger 4 second.

In FIG. 1, the upstream heat exchanger 2 is in the foreground and the downstream heat exchanger 4 is in a plane situated to the rear. Here the upstream heat exchanger 2 is a so-called low-temperature cooling radiator used to cool a cooling liquid of a so-called low-temperature heat exchange loop comprising in particular an air conditioning condenser and/or a supercharger air cooler. The downstream heat exchanger 4 is a high-temperature cooling radiator intended to cool a cooling liquid of a heat exchange loop including an engine of the vehicle. The air that passes through this downstream exchanger 4 cools the cooling liquid of the engine.

Each exchanger 2, 4 comprises for example a heat exchange bundle 6 and manifold chambers 8 disposed laterally on respective opposite sides of the bundle 6. The air flow F passes across the bundle 6. It comprises a set of tubes parallel to one another opening into the manifold chambers 8 for the circulation of the cooling liquid.

The cooling module 1 is configured to allow a substantially airtight flow of air between said heat exchangers 2, 4, that is to say the upstream heat exchanger 2 and the downstream heat exchanger 4 are assembled to one another so that the downstream heat exchanger 4 does not have pass directly through it air coming from outside the module. In other words, the air flow F passing through the downstream heat exchanger 4 comes only from the air flow F passing through the upstream heat exchanger 2. To this end, the cooling module 1 may for example comprise sealing means enabling all of the flow of air that has passed through the upstream heat exchanger 2 to be conveyed to the downstream heat exchanger 4 without loss of air flow rate. These sealing means, not shown, may for example comprise a shroud arranged between the two upstream heat exchangers 2, 4. Another alternative is for the heat exchangers 2, 4 to be arranged back to back.

To facilitate the passage of a flow of air in the cooling module 1, in particular when the vehicle is stationary, the module comprises a motorized fan 10 adapted to cause air to circulate in the cooling module 1. As shown in FIG. 1, the motorized fan 10 is disposed on the downstream side of the downstream heat exchanger 4, the motorized fan 10 being configured to aspirate air from an air intake of the vehicle, preferably defined by its radiator grille.

The cooling module 1 according to the invention further comprises a device 12 for controlling the air flow arranged between the upstream heat exchanger 2 and the downstream heat exchanger 4. The control device 12 controls the passage of the air flow F from the upstream heat exchanger 2 to the downstream heat exchanger 4 via retractable screens 14, in other words sliding shutters or roller blinds. To this end, the screens 14 are able to pass from a closed or obstructing configuration in which they block entirely the passage of the air flow F to an open or opening configuration in which they free a maximum passage for the air flow F. In other words, the screens 14 do not constitute an obstacle to the flow of the air flow F, or in other words the screens 14 are positioned so as to allow the air flow F to pass at a maximum air flow rate. The screens 14 are obviously able to adopt any intermediate position. The screens are for example made of fiberglass, in particular of PTFE impregnated with glass fibers.

Figure 2:
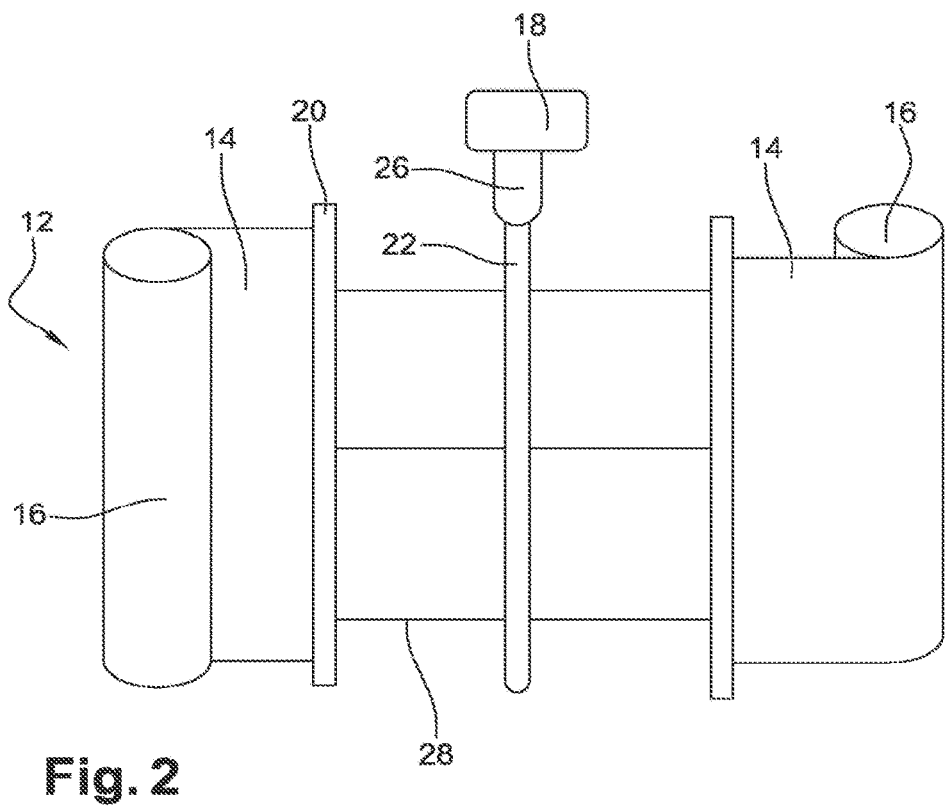
FIG. 2 is a diagrammatic perspective view of the components of a first embodiment of the air flow control device.

FIG. 2 is a more detailed diagrammatic view of the control device 12 according to the invention seen from in front. The control device 12 comprises two screens 14 each rolled onto or unrolled from a support 16 to go from the open configuration to the closed configuration. The supports 16 are adapted to allow rolling and unrolling of the screens 14. They may for example take the form of a roller, that is to say a right cylinder (or a circular cylinder with bases delimited by two equal size and parallel circles), as shown in FIG. 2. In order to enable the movement of the screens 14 the control device 12 includes a motor or actuator 18. The screens 14 may also include at their end a lip seal 20.

In order to guarantee a good seal of the assembly, the control device 12 may include a closing element 22 in the form of an element on which the screens 14 come to bear at the end of travel into the closed configuration, namely when they are unrolled.

Figure 2A:
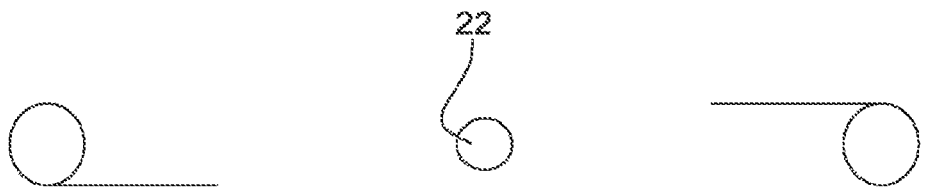
FIGS. 2A to 2D are diagrammatic partial views of the control device seen from above.
Figure 2B:
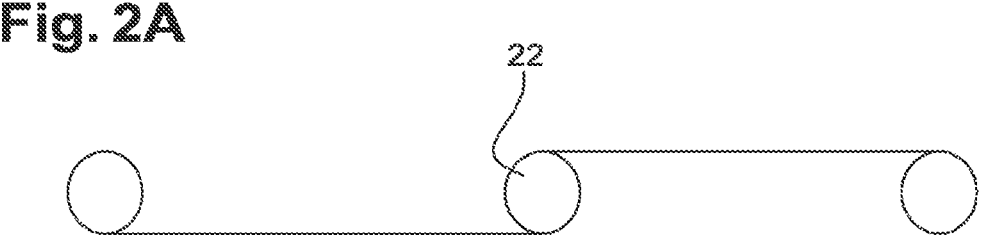
Figure 2C:
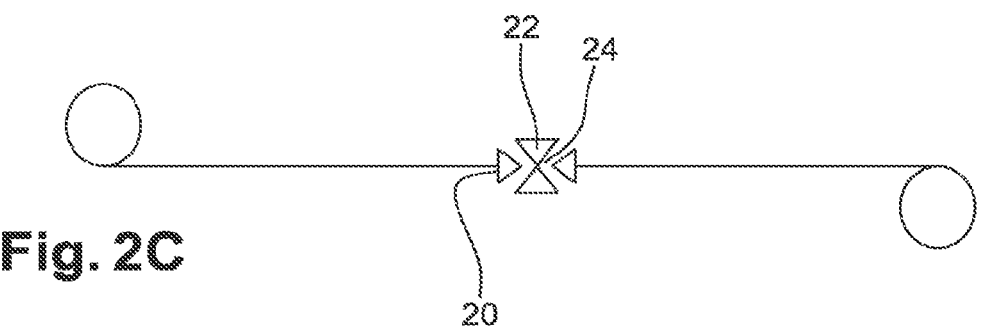
Figure 2D:
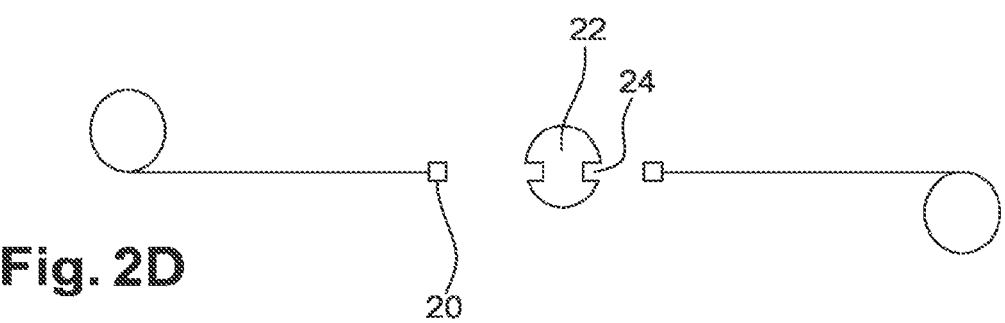

FIGS. 2A to 2D show different embodiments of this closing element 22. The closing element 22 may for example be a simple cylindrical rod as shown in FIGS. 2A and 2B, in which the shutters, on going from an intermediate configuration (FIG. 2A) to the closed configuration (FIG. 2B) end their travel bearing on the closing element as shown in FIG. 2B. The closing element 22 may take other forms such as for example a rod with notches 24 of complementary shape to the lip seals 20 (FIG. 2C, 2D). The invention is not limited either to the shape of the lip seals 20 or to the shape of the notches.

Figure 3:
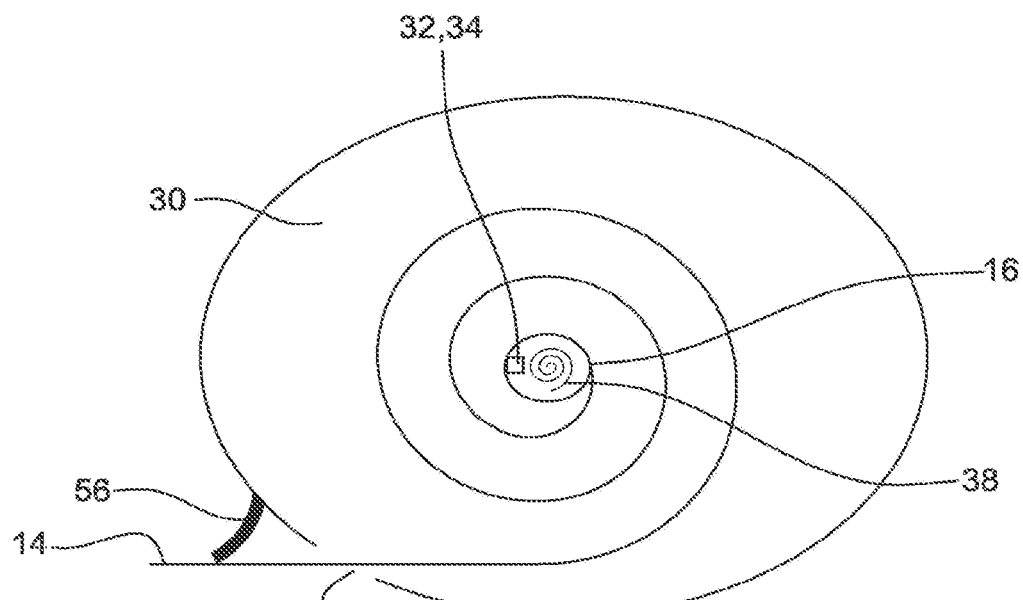
FIG. 3 is a diagrammatic view of a component of the control device seen from above.

In the open configuration the screens 14 do not form an obstacle to the flow of the air flow F. To this end, the screens 14 are completely rolled up on the supports 16. It is possible to arrange the screens 14 on the external surface of a support 16 of cylindrical shape. However, in a configuration of this kind the screens 14 are more exposed to the external air thereby resulting in premature wear and deterioration of the screens 14. To remedy this wear, a hollow tube 30 may be arranged around the support 16, the hollow tube 30 including an opening 36 adapted to allow the screen 14 to pass through as shown in FIG. 3.

In order to clean the screen 14 and to prevent its premature deterioration, as well as to guarantee an optimum rolling around the support 16, the hollow tube 30 may have on its surface one or more tongues 56 adapted to rub on the surface of the screen 14 and to remove all dirt or dust. The tongue or tongues may be arranged on the external surface of the hollow tube 30 as shown in FIG. 3 or on the internal surface of the hollow tube 30.

In order to ensure good retention and movement of the screens 14, each screen 14 may be welded to a support 16 or each screen 14 may also have an end with a retaining element 32, for example a plastic rod, adapted to be introduced into a notch 34 on the support 16 of complementary shape to the retaining element 32. A return spring 38 may also be arranged at the center of the support 16 so as to facilitate the movement of the screens 14 and to maintain the screens 14 under tension. The return spring 38 is adapted to be prestressed when the screens 14 are in the closed configuration, in other words unrolled entirely from around the support 16, and tensioned when the screens 14 are in the open configuration, that is to say rolled up.

In order to obstruct the flow of the air flow F as little as possible, it is necessary to arrange the supports 16 and where applicable the hollow tubes 30 in the vicinity of the manifold chambers 8 of the heat exchangers 2, 4 as shown in FIG. 1. By this is meant that the supports 16 are arranged so that the manifold chambers 8 of the heat exchangers 2, 4 and the supports 16 are aligned on a longitudinal axis.

In order to prevent the deterioration of the films, the control device 12 may further comprise an airtight frame 40 comprising bars or a grid so as to allow the air flow to flow whilst preventing the screen 14 from coming to abut against the heat exchangers 2, 4. As shown in FIG. 1, the control device 12 comprises an airtight seal 40 with a grille arranged between the control device 12 and the downstream high-temperature heat exchanger 4, heat being liable to cause deterioration of the screens 14. Of course, it is possible to design a control device 12 comprising two grills arranged on respective opposite sides of the control device 12 or to be more precise a first grille positioned between the upstream heat exchanger 2 and the control device 12 and a second grille arranged between the downstream heat exchanger 4 and the control device 12. To prevent contact between the screens 14 and the heat exchanger 2, 4 rigid bars connected to the frame are positioned in the frame 40. The bars or the grid may be situated in front of the tubes of the heat exchangers 2, 4 in order not to disturb the flow.

These features described above may be used separately or in combination in each of the embodiments described hereinafter. The following embodiments differ only in how to actuate and to move the screens 14.

According to a first embodiment shown in FIG. 2 the motor 18 is connected to the closing element 22 by means of an output shaft 26, thus enabling rotation of the closing element 22. The closing element 22 is also connected to the screens 14 or to the lip seals 20 by means of a filamentary connection 28 or any other guide that may be envisaged such as a strap, a link or a rod. The control device 12 may comprise a single filamentary connection 28 or a plurality of filamentary connections 28, for example three for each screen 14, as shown in FIG. 2, in order to guarantee homogeneous rolling/unrolling of the screens 14. In this way a single motor 18 suffices for moving the screens 14.

Figure 4:
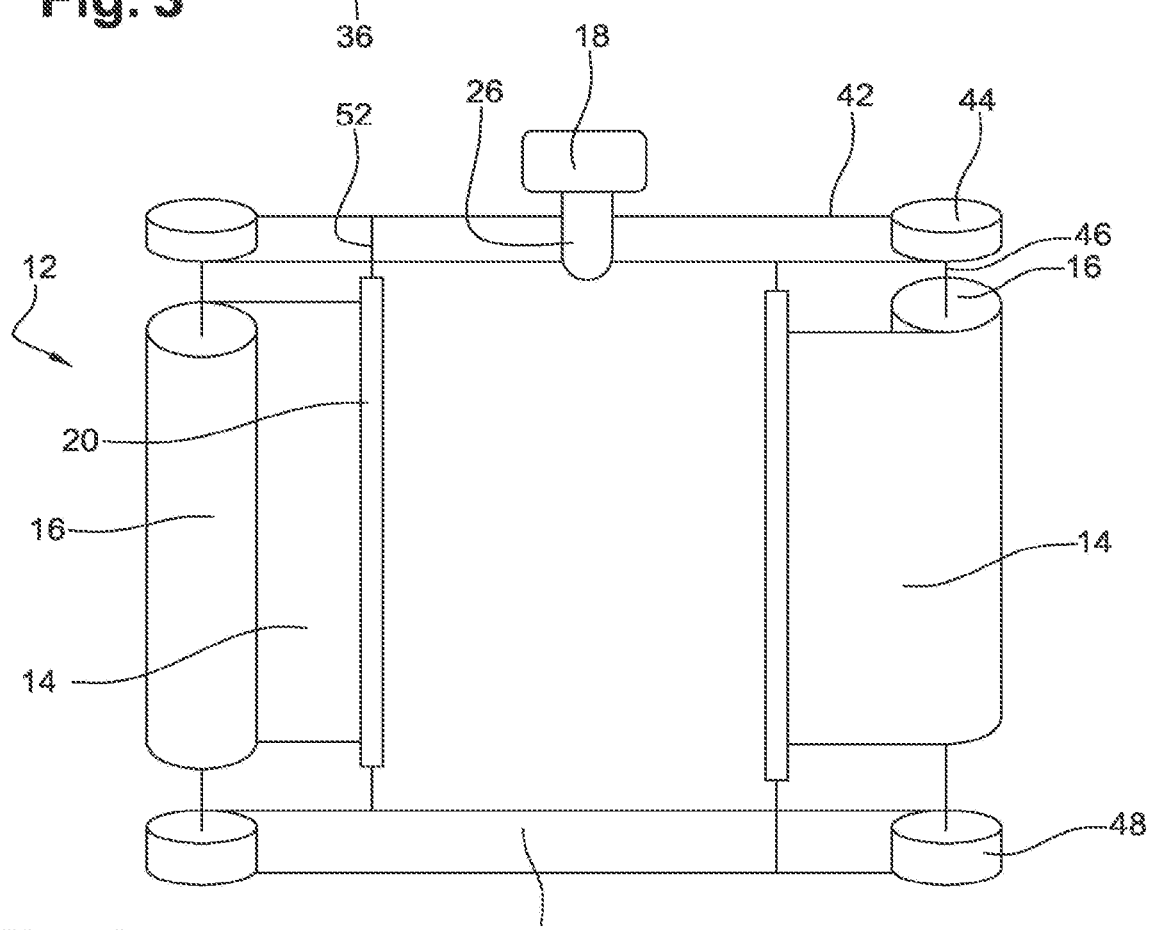
FIG. 4 is a diagrammatic perspective view of the components of a second embodiment the air flow control device.

FIG. 4 shows a second embodiment of the production device 12. The second embodiment is similar to the embodiment described above except for the actuation of the screens 14. In this embodiment a motor 18, which may for example be a hydraulic or pneumatic cylinder, induces a pivoting movement and moves a first belt 42 via the output shaft 26. This first belt 42 is connected to two first driven gears 44 each associated with a support 16 for a screen 14 by means of a connection 46 forming a turning axis of the screen. The fixed connection 46 may be connected to the return spring 38 and therefore retransmit the movement induced by the cylinder to the support 16 and therefore to the film 14. Alternatively, the fixed connection 46 may pass through the support 16 without being connected to the return spring 38 and connect a first gear 44 to a second gear 48, the first and second gears 44, 48 being arranged on respective opposite sides of the support 16. The two second gears 48 are also interconnected by a second belt 50. In order to facilitate movement of the screens 14 the first and second belts 42, 50 comprise filamentary connections 52 thus connecting each belt to the two ends of a screen 14, in particular at the level of the lip seal 20 as shown in FIG. 4.

Figure 5:
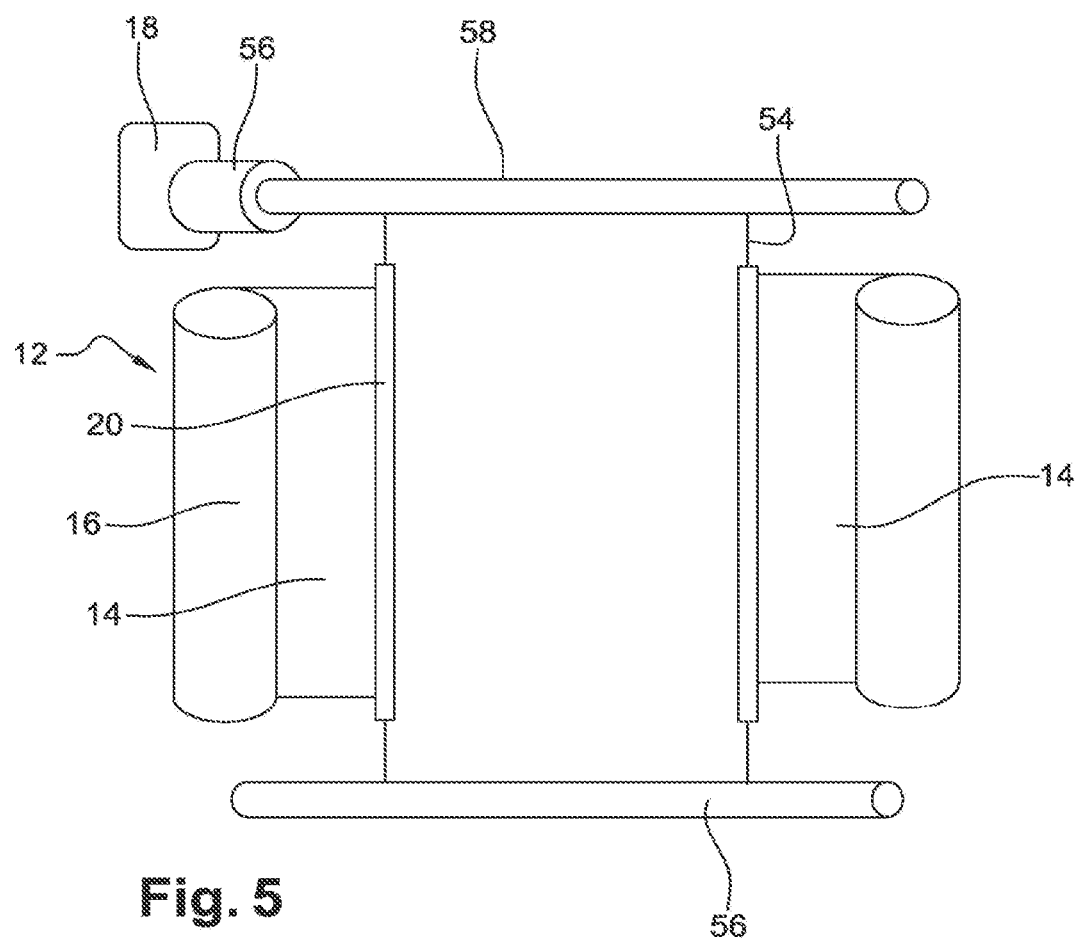
FIG. 5 is a diagrammatic perspective view of the components of a third embodiment the air flow control device.

FIG. 5 shows a third embodiment of the production device 12. The third embodiment is similar to the embodiments described above except for the actuation of the screens 14. In this embodiment, a motor 18, which may for example be a hydraulic or pneumatic cylinder, imparts a pivoting movement to a lead screw 58 via the output shaft 26. The lead screw 58 includes reverse threads and is connected to each screen 14, for example at the level of the lip seal 20, by a filamentary connection 54, such as a belt, so that when the lead screw 58 begins to rotate the filamentary connection 54 is moved, thereby driving movement of the screen 14. The control device 12 may further include a second lead screw 56 arranged at the opposite end of the screens 14 that is also connected to each screen 14 by a filamentary connection 54.

In this embodiment the filamentary connection 54 may for example be a filament on the one hand fixed by a hole, a hook or a clip to the screen 14 or to the lip seal 20 and on the other hand fixed to a nut sliding on the lead screw 56, 58.

Although the closing element 22 is mainly described in the first embodiment, an element of this kind may equally be adopted in the second and third embodiments. In the first embodiment the closing element 22 enables transmission of the movement in rotation induced by the motor 18 and guarantees the airtightness of the control device 12 when the screens 14 are in the closed configuration. The addition of a closing element 22 as described above in the second and third embodiments makes it possible to guarantee the airtightness of the control device 12 when the screens 14 are in the closed configuration. A closing element of this kind may for example be fixed to the airtight frame 40 or to the heat exchangers 2, 4.

Alternatively, not adding the closing element in the embodiments 2 and 3 and adding lip seals of complementary shape may be envisaged. For example, the control device 12 may comprise a first screen 14 having a lip seal 20 with a protuberance over its full height and a second screen 14 having a lip seal 20 with a notch of complementary shape to the protuberance over its full height. In other words, a first screen 14 may feature a lip seal 20 with a rib at its end whereas the second screen 14 will feature at its end a lip seal 20 with a groove of complementary shape to the rib.

The control device 12 according to the invention is more advantageous compared to the prior art because it guarantees continuously adjustable partial opening, therefore enabling precise adaptation of cooling and producing a better aerodynamic gain. Moreover, the opening at the center of the heat exchangers 2, 4 makes it possible to optimize their operation. Also, the partial opening is situated at the center of the heat exchangers 2, 4 in a manner perpendicular to the tubes, thereby avoiding differential expansion at the level of the tube ends fixed to the manifold chambers 8 and therefore leaks.

Moreover, the control device 12 enables synchronous or symmetrical movement of the screens 14 as described in the foregoing embodiments.

It is also possible for the control device 12 to enable asymmetrical movement of the screens 14. There may be cited by way of example adding a two-part closing element 22 where each part is actuated by a separate motor 18. There is also the use of a lead screw 56, 58 with opposite threads and of different sizes. There may equally be mentioned the idea of arranging inside each support 16 return springs 38 having different return forces. Finally, there may also be mentioned the possibility of arranging two motors 18 with each motor 18 actuating only one screen 14.

Although the control device 12 is described as being arranged between the two heat exchangers 2, 4 it is also possible to arrange it on the downstream side of the downstream heat exchanger 4 or on the upstream side of the upstream heat exchanger 2.

It must nevertheless be understood that these examples are provided by way of illustration of the subject matter of the invention. The invention is not limited to these embodiments described above by way of example only. It encompasses diverse modifications, alternative shapes and other variants that the person skilled in the art could envisage within the scope of the present invention and in particular any combination of the various embodiments described above.

Another embodiment of the invention will now be described with reference to FIGS. 6 and 7.

In this embodiment the screens 14 are adapted to be actuated separately.

Figure 6:
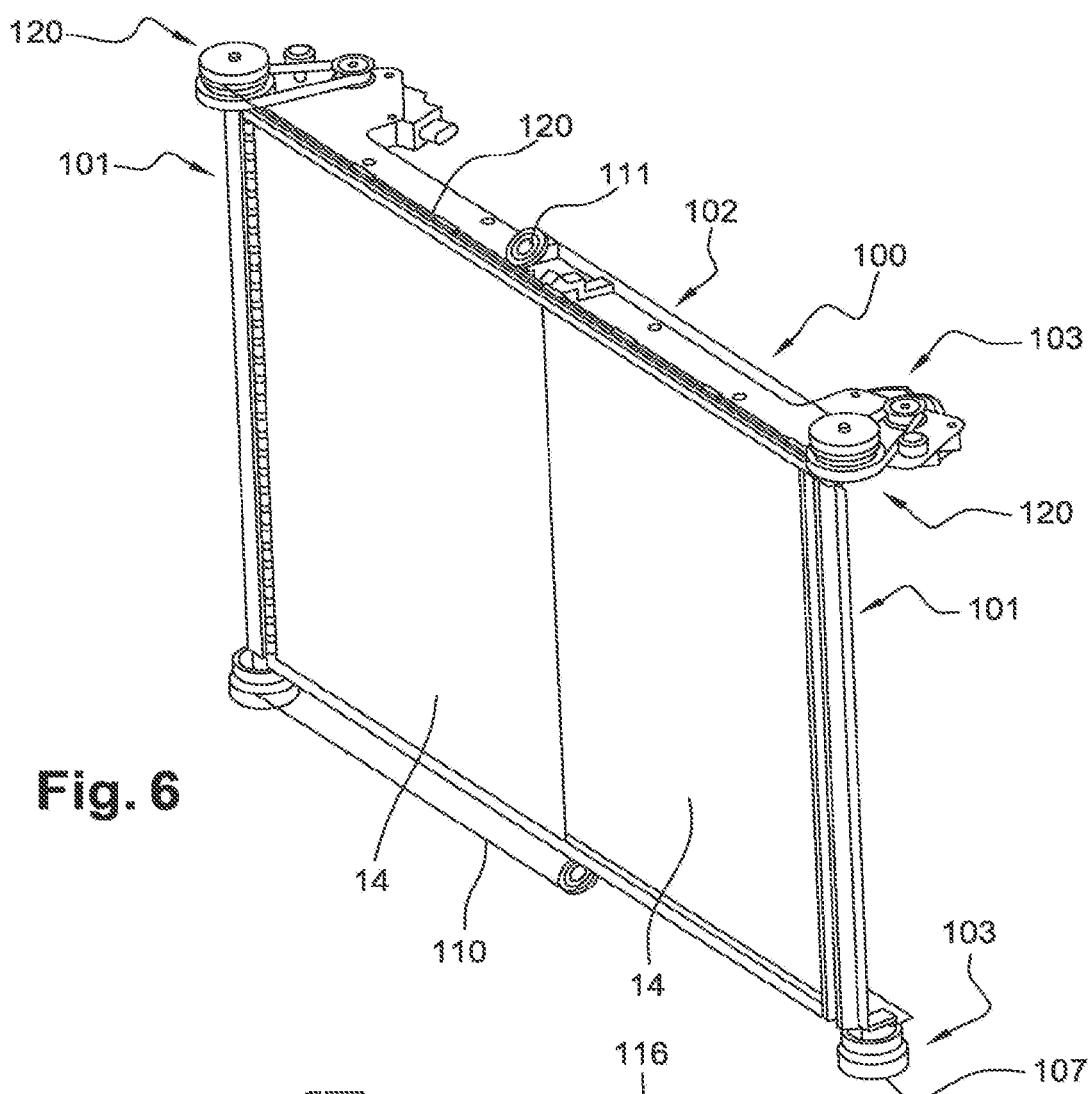
FIGS. 6 and 7 show another embodiment of the invention.

As shown in FIG. 6, the control device includes a frame 100 for the retractable screens 14, which frame is located in front of the high-temperature heat exchanger 4. The shafts 101 of the retractable screens 14 are fixed to the frame 100.

The rectangular opening 102 of the frame 100 and the bearings 103 of the shafts are placed so as to facilitate the movement of the retractable screens 14.

Figure 7:
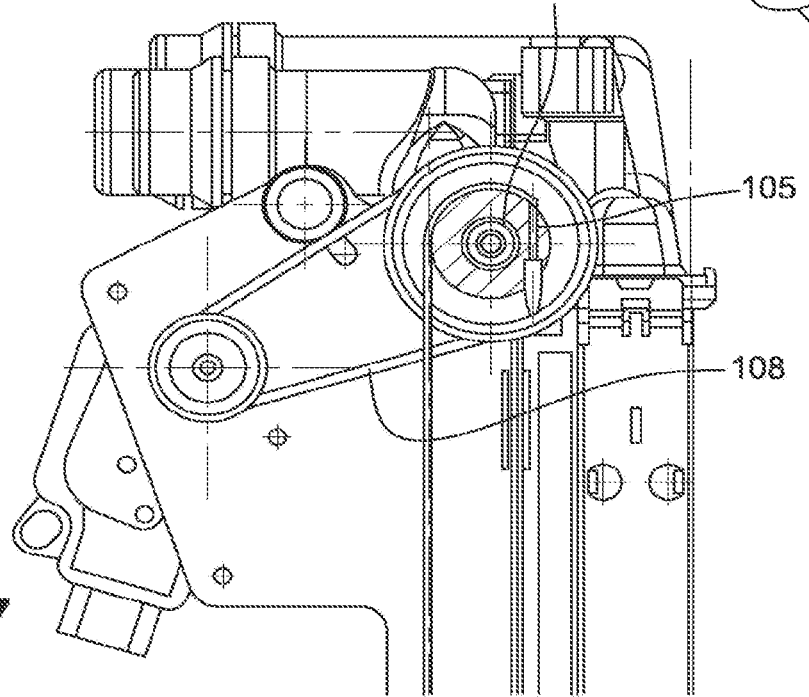

As can be seen in FIG. 7 the retractable screens 14 are fixed to the shaft 101 thanks to a rectangular notch 105.

At each end of the shaft 101 is fixed a gear to be engaged on one side in a pulley 107 with an interior gear and on the other side with the actuating gear via a belt 108.

A filament 110 is disposed on each pulley. The filament paths extend as far as the middle of the control device, are rolled up around an idler pulley 111 and are then fixed to the guide of the retractable screens 14.

The attachment plates of the idler pulleys also feature a rectilinear notch for the movement of the guide.

This notch is covered with a fiber seal to limit the leakage of air.

Above the pulley 107 a torsion spring 116 is inserted on one side into a square notch of the shaft and on the other side into a cover. The spring 116 enables retention of the retractable screens 14 thanks to the force applied to the shaft by the spring. This spring 116 is adapted to participate in managing the opening and closing speeds.

In addition to this mechanism, a grille is fixed to the frame 100 between the retractable screens 14 and the high-temperature heat exchanger 4 in order to avoid damaging the closed retractable screens 14 when air is blown.

Thanks to the two actuators 120 and to the pulley, gear and filament system, the retractable screens 14 can be rolled up and unrolled separately.

The first advantage is to provide the safe mode: in the event of malfunctioning of one of the actuators; it enables the other screen to be opened for cooling whatever happens to the high-temperature heat exchanger 4. The second advantage is opening in the middle of the heart of the high-temperature heat exchanger 4. This makes it possible to limit the thermal shock on the tube ends and in most cases the opening between the retractable screens 14 is aligned with the axis of a fan. The air flow may be well guided and maximized given the smaller opening.

An additional functionality could be added to the fixing plates. Thus, as shown in FIG. 6, discharge flaps 120 may be added to ensure the flow of air over the first exchanger when there is no need for cooling by the high-temperature heat exchanger 4, the retractable screens 14 remaining closed. The discharge flaps 120 may be actuated thanks to a surplus travel of the retractable screens 14. The guide then pushes a lug that opens the discharge flap.

The invention claimed is:

1. A device for controlling an air flow circulating in a first heat exchanger for a motor vehicle, the control device comprising:
    at least two screens,
    the control device being configured to go from a closed configuration to an open configuration, wherein, in the closed configuration, the at least two screens obstruct a passage of the air flow completely, and, in the open configuration, the at least two screens are positioned to allow the air flow to pass with a maximum flow rate,
    wherein the at least two screens move away from one another when the control device goes from the closed configuration to the open configuration and move toward one another when the control device goes from the open configuration to the closed configuration, and
    wherein a first screen of the at least two screens includes a lip seal at one end with a rib, and a second screen of the at least two screens includes another lip seal at one end with a groove of complementary shape to the rib.

2. The control device as claimed in claim 1, wherein the at least two screens are arranged in a frame adapted to prevent all contact between one of said at least two screens and the first heat exchanger.

3. The device as claimed in claim 2, wherein the frame and the screens have an overall size in an axial direction measured along an axis of flow of the air less than 30 mm.

4. The control device as claimed in claim 1, wherein a closing element is arranged between the at least two screens and on which the at least two screens come to bear on completing their travel into the closed configuration.

5. The control device as claimed in claim 4, wherein the closing element includes a cylindrical rod with notches of complementary shape to the lip seals.

6. The control device as claimed in claim 4, wherein the at least two screens are configured to be moved by an actuator, the actuator being a motor coupled to the closing element, said closing element being connected to each screen by at least one filamentary connection.

7. The control device as claimed in claim 1, wherein the screens are configured to be moved by an actuator, the actuator being a motor coupled to a gear by a belt, said belt being connected to each screen by at least one filamentary connection.

8. The control device as claimed in claim 1, wherein the screens are configured to be moved by an actuator, the actuator being a motor coupled to a lead screw, the lead screw being connected to each screen by at least one filamentary connection.

9. The device as claimed in claim 1, wherein a thickness of the screens is between 0.1 and 0.15 mm inclusive.

10. The device as claimed in claim 1, wherein at least one of the screens is made of textile canvas.

11. The device as claimed in claim 10, wherein the canvas includes glass fibers and preferably a PTFE coating.

12. A cooling module comprising, a low-temperature heat exchanger;

a high-temperature heat exchanger; and a control device arranged between the low-temperature and high-temperature heat exchangers, the control device comprising:

at least two screens, the control device being configured to go from a closed configuration to an open configuration, wherein, in the closed configuration, the at least two screens obstruct a passage of an air flow completely, and, in the open configuration, the at least two screens are positioned to allow the air flow to pass with a maximum flow rate, wherein the at least two screens move away from one another when the control device goes from the closed configuration to the open configuration and move toward one another when the control device goes from the open configuration to the closed configuration, wherein a first screen of the at least two screens includes a lip seal at one end of the first screen having a rib, and a second screen of the at least two screens includes another lip seal at one end with a groove of complementary shape to the rib, the low-temperature heat exchanger being positioned on an upstream side of the control device and the high-temperature heat exchanger being positioned on a downstream side of the control device.

* * * * *